United States Patent
Cao et al.

(10) Patent No.: US 10,140,554 B2
(45) Date of Patent: Nov. 27, 2018

(54) VIDEO PROCESSING

(71) Applicant: WIZR LLC, Santa Monica, CA (US)

(72) Inventors: Song Cao, Los Angeles, CA (US); Genquan Duan, Beijing (CN)

(73) Assignee: WIZR LLC, Santa Monica, CA (US)

( * ) Notice: Subject to any disclaimer, the term of this patent is extended or adjusted under 35 U.S.C. 154(b) by 0 days.

(21) Appl. No.: 15/413,340

(22) Filed: Jan. 23, 2017

(65) Prior Publication Data
US 2017/0213111 A1    Jul. 27, 2017

Related U.S. Application Data (60) Provisional application No. 62/281,291, filed on Jan. 21, 2016.

(51) Int. Cl.
| | |
|---|---|
| *G06K 9/00* | (2006.01) |
| *G06K 9/62* | (2006.01) |
| *G06K 9/46* | (2006.01) |
| *G06N 99/00* | (2010.01) |

(Continued)

(52) U.S. Cl.
CPC ....... *G06K 9/6269* (2013.01); *G06K 9/00577* (2013.01); *G06K 9/00718* (2013.01); *G06K 9/036* (2013.01); *G06K 9/4604* (2013.01); *G06K 9/6202* (2013.01); *G06K 9/6253* (2013.01); *G06N 99/005* (2013.01); *G06T 5/20* (2013.01); *G06K 2009/00738* (2013.01)

(58) Field of Classification Search
CPC ............. G06K 9/00577; G06K 9/4604; G06K 9/6202; G06K 9/6269; G06N 99/005; G06T 5/20
See application file for complete search history.

(56) References Cited

U.S. PATENT DOCUMENTS

| | | | | |
|---|---|---|---|---|
| 8,930,288 | B2 * | 1/2015 | Toderici | G06F 17/30799 706/12 |
| 8,977,629 | B2 * | 3/2015 | Goswami | G06F 17/30247 382/162 |
| 2008/0058593 | A1 | 3/2008 | Gu et al. | |

OTHER PUBLICATIONS

International Search Report dated Apr. 20, 2017 as received in Application No. PCT/US2017/014630.

(Continued)

*Primary Examiner* — Phuoc Tran
(74) *Attorney, Agent, or Firm* — Maschoff Brennan (57) ABSTRACT

A computer-implemented method to train a video annotation machine learning process is disclosed. The method may include obtaining a video and determining that a predetermined event occurs in the video. The method may include identifying a first set of object attribute data associated with the event in the video based on a machine learning process and machine learning data. The method may include receiving a second set of object attribute data of the event in the video from a user or external source. The method may also include comparing the first set of object attribute data with the second set of object attribute data. The method may include validating the quality of the first set of object attribute data when the first set of object attribute data is determined to be sufficiently similar to the second set of object attribute data. The method may include revising the machine learning process and the machine learning data when the first set of object attribute data is determined not to be sufficiently similar to the second set of object attribute data.

20 Claims, 4 Drawing Sheets

(51) Int. Cl.
*G06T 5/20* (2006.01)
*G06K 9/03* (2006.01)

(56) References Cited

OTHER PUBLICATIONS

Written Opinion of the International Searching Authority dated Apr. 20, 2017 as received in Application No. PCT/US2017/014630.

* cited by examiner

VIDEO PROCESSING

CROSS-REFERENCE TO A RELATED APPLICATION

This application claims the benefit of and priority to U.S. Provisional Application No. 62/281,291, filed on Jan. 21, 2016, titled "VIDEO PROCESSING," which is incorporated herein by reference in its entirety.

BACKGROUND

Modern video surveillance systems provide features to assist those who desire safety or security. One such feature is automated monitoring of the video created by surveillance cameras. A video surveillance system may include a video processor to detect when events occur in the videos created by a surveillance camera system.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to train a video annotation machine learning process is disclosed. The method may include obtaining a video and determining that a predetermined event occurs in the video. The method may include identifying a first set of object attribute data associated with the event in the video based on a machine learning process and machine learning data. The method may include receiving a second set of object attribute data of the event in the video from a user or external source. The method may also include comparing the first set of object attribute data with the second set of object attribute data. The method may include validating the quality of the first set of object attribute data when the first set of object attribute data is determined to be sufficiently similar to the second set of object attribute data. The method may include revising the machine learning process and the machine learning data when the first set of object attribute data is determined not to be sufficiently similar to the second set of object attribute data.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Disclosure is read with reference to the accompanying drawings.

DISCLOSURE

Systems and methods are disclosed for training a video annotation machine learning process using video annotation data from a third party. Systems and methods are also disclosed for processing images that represent a video. Various other video and/or image processing systems and/or methods are also described.

Figure 1:
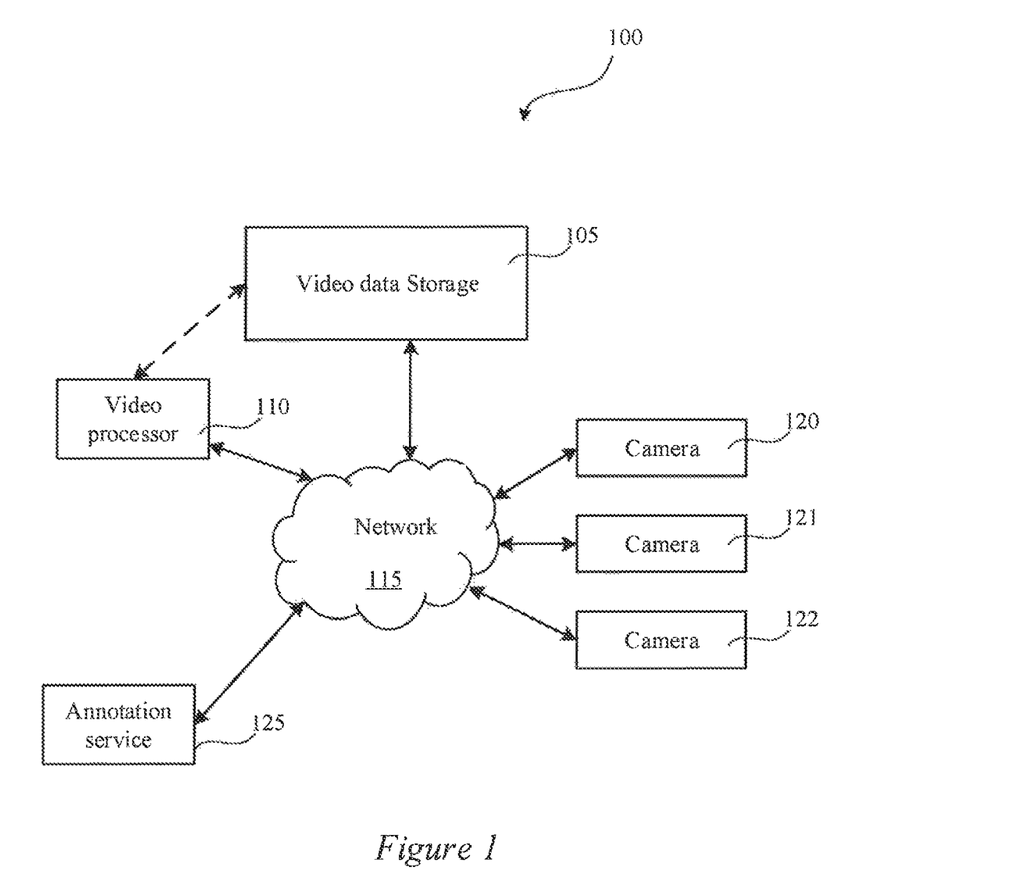
FIG. 1 illustrates a block diagram of a system 100 for a multi-camera video tracking system.

FIG. 1 illustrates a block diagram of a system 100 that may be used in various embodiments. The system 100 may include a plurality of cameras: camera 120, camera 121, and camera 122. While three cameras are shown, any number of cameras may be included. These cameras may include any type of video camera such as, for example, a wireless video camera, a black and white video camera, surveillance video camera, portable cameras, battery powered cameras, CCTV cameras, Wi-Fi enabled cameras, smartphones, smart devices, tablets, computers, GoPro cameras, wearable cameras, etc. The cameras may be positioned anywhere such as, for example, within the same geographic location, in separate geographic location, positioned to record portions of the same scene, positioned to record different portions of the same scene, etc. In some embodiments, the cameras may be owned and/or operated by different users, organizations, companies, entities, etc.

The cameras may be coupled with the network 115. The network 115 may, for example, include the Internet, a telephonic network, a wireless telephone network, a 4G network, etc. In some embodiments, the network may include multiple networks, connections, servers, switches, routers, connections, etc., that may enable the transfer of data. In some embodiments, the network 115 may be or may include the Internet. In some embodiments, the network may include one or more LAN, WAN, WLAN, AN, SAN, PAN, EPN, and/or VPN.

In some embodiments, one or more of the cameras may be coupled with a base station, digital video recorder, or a controller that is then coupled with the network 115.

The system 100 may also include video data storage 105 and/or a video processor 110. In some embodiments, the video data storage 105 and the video processor 110 may be coupled together via a dedicated communication channel that is separate than or part of the network 115. In some embodiments, the video data storage 105 and the video processor 110 may share data via the network 115. In some embodiments, the video data storage 105 and the video processor 110 may be part of the same system or systems. In some embodiments, the video processor 110 may include various machine learning algorithms, functions, etc.

In some embodiments, the video data storage 105 may include one or more remote or local data storage locations such as, for example, a cloud storage location, a remote storage location, etc.

In some embodiments, the video data storage 105 may store video files recorded by one or more of camera 120, camera 121, and camera 122. In some embodiments, the video files may be stored in any video format such as, for example, mpeg, avi, etc. In some embodiments, video files from the cameras may be transferred to the video data storage 105 using any data transfer protocol such as, for example, HTTP live streaming (HLS), real time streaming protocol (RTSP), Real Time Messaging Protocol (RTMP), HTTP Dynamic Streaming (HDS), Smooth Streaming, Dynamic Streaming over HTTP, HTML5, Shoutcast, etc.

In some embodiments, the video data storage 105 may store user identified event data reported by one or more individuals. The user identified event data may be used, for example, to train the video processor 110 to capture feature events.

In some embodiments, a video file may be recorded and stored in memory located at a user location prior to being transmitted to the video data storage 105. In some embodiments, a video file may be recorded by the camera and streamed directly to the video data storage 105.

In some embodiments, the video processor 110 may include one or more local and/or remote servers that may be used to perform data processing on videos stored in the video data storage 105. In some embodiments, the video processor 110 may execute one or more algorithms on one or more video files stored within the video storage location. In some embodiments, the video processor 110 may execute a plurality of algorithms in parallel on a plurality of video files stored within the video data storage 105. In some embodiments, the video processor 110 may include a plurality of processors (or servers) that each execute one or more algorithms on one or more video files stored in video data storage 105. In some embodiments, the video processor 110 may include one or more of the components of computational system 400 shown in FIG. 4.

In some embodiments, the system 100 may include a video annotation service 125 or have access to data provided by the video annotation service 125. Video annotation service 125 may receive a video from the video processor 110 and/or the video data storage 105 and annotate the video with video annotations. The video annotation service 125 may output video annotations for an input video. In some embodiments, the video may only be a portion of a video or a clip of interest. The video annotation service 125 may use any number of techniques to annotate the video based on any number of video attributes such as, for example, human annotation of the video.

In some embodiments, the video attributes may include attributes such as, for example, object boundary data, object characteristic data, and/or object event data. The video attributes may vary depending on the object type. The objects, for example, may include humans, animals, cars, bikes, etc.

The object boundary data may include coordinate data describing the boundary of the object within the frame of the video. For example, the object boundary data may specify a plurality of points that when connected form a polygonal shape bounding or roughly bounding the object. In some embodiments, the object boundary data may include pixel data that identifies the pixels representing the object data. Various other data or data types may be used to identify the boundary of an object within the video or a video frame. For example, a polygon (or rectangle) can be used to define the boundary of an object. In this example, the boundary data may include a vector or matrix comprising three or more coordinates corresponding with the indices of the boundary of the object within the video or the video frame.

The object characteristic data may include characteristics that are general to most objects or specific to certain objects. For example, the object characteristic data may include data specifying the objects' size, color, shape, etc. For a human object, the specific object characteristic data may include an estimated sex, gender, age, race, approximate height, approximate weight, hair color, clothing type, accessories, the facial expression of the human, etc. In some embodiments, the accessories may include whether the human is carrying or wearing a box, package, backpack, luggage, briefcase, overnight bag, umbrella, gun, purse, hat, hoody, sunglasses, etc. For a vehicle object, specific object characteristics may include the number of wheels, vehicle type, the number of doors, etc.

The object event data may include, for example, general event data and/or specific event data. For example, general event data may include the speed of the object, the velocity of the object, the orientation of the object, the direction of motion of the object, whether the object stops, etc. For a human object, specific event data may include the placement and/or motion of the human's hands, whether the human is walking, whether the human is running, the direction where the human is looking, whether the human is riding a bicycle, whether the human is standing still, whether the human is jumping, whether the human is sitting, etc.

In some embodiments, video annotation data may be included in a file separate and/or distinct from the video. For example, the video annotation data may be included in a text file or a metadata file that includes video attribute data and/or data identifying the video. In some embodiments, the video attribute data may include frame data such as, for example, frame timing data. In some embodiments, the video attribute data may vary for each frame of the video. For example, as the video attributes change between frames, the video annotation data may vary accordingly.

In some embodiments, the video annotation service 125 may receive a video from the video processor 110 and/or the video data storage 105, for example, through the network 115 as an input and in exchange may provide video annotation data to the system 100. The video annotation data, for example, may be stored in video data storage 105 or another data storage location such as, for example, another cloud storage location.

Figure 2:
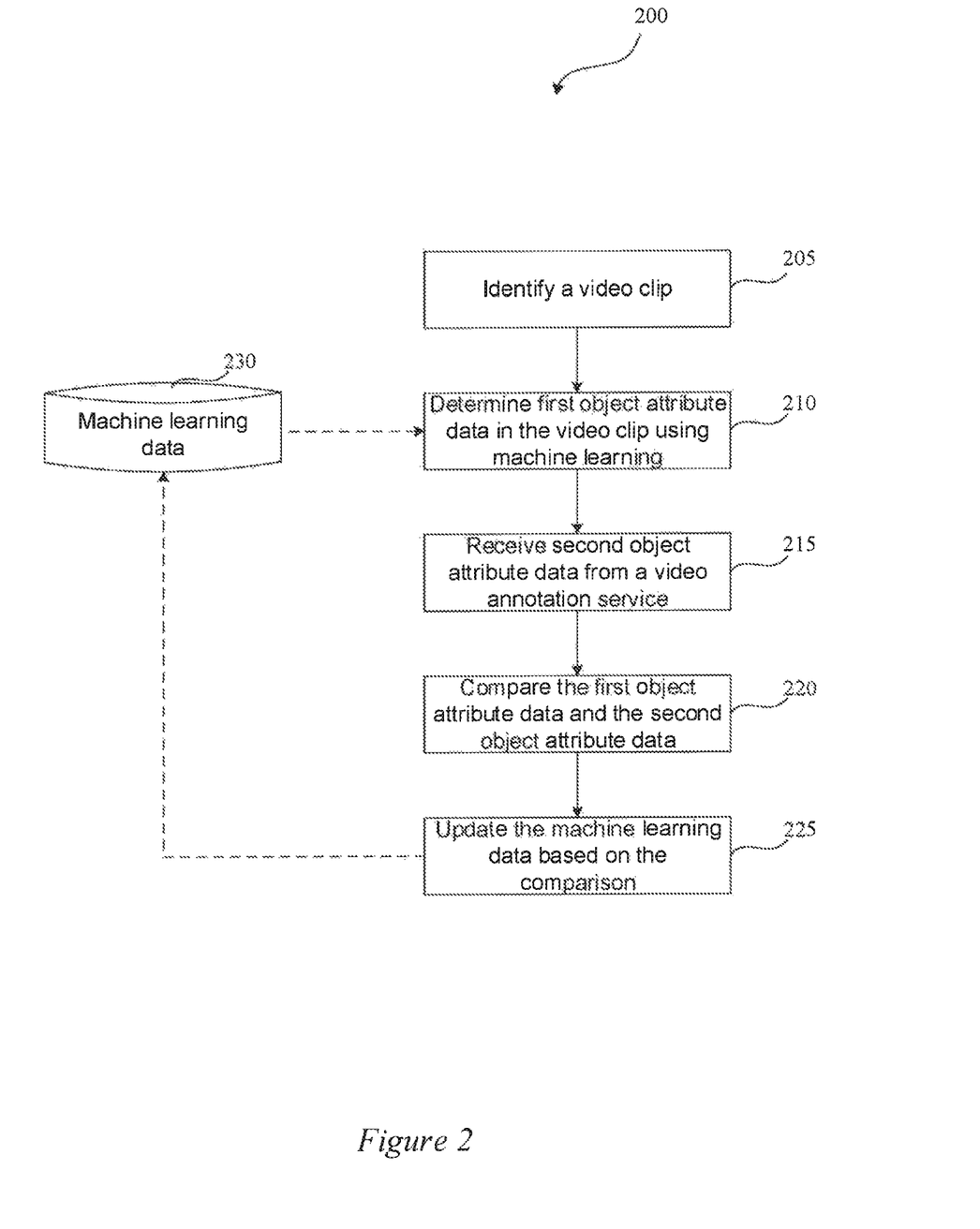
FIG. 2 is a flowchart of a method for training a video annotation machine learning process according to some embodiments.

FIG. 2 is a flowchart of an example process 200 for training a video annotation machine learning process. One or more steps of the process 200 may be implemented, in some embodiments, by one or more components of system 100 of FIG. 1, such as video processor 110. Although illustrated as discrete blocks, various blocks may be divided into additional blocks, combined into fewer blocks, or eliminated, depending on the desired implementation.

Process 200 may begin at block 205. At block 205 a video clip may be identified from one or more videos such as, for example, videos stored in video data storage 105. For example, the video clip may be a portion of a video that includes an event of interest. The video clip, for example, may include portions or frames of the video before and/or after the video clip in addition to the video clip. In some embodiments, the video clip may include a single frame or multiple frames selected from one or more videos.

In some embodiments, low level events such as, for example, motion detection events may be used to identify the video clip. In some embodiments, a feature detection algorithm may be used to determine that an event has occurred. In some embodiments, the feature description can be determined using a low level detection algorithm.

An event may include any number or type of occurrences captured by a video camera and stored in a video file. An event may include, for example, a person moving through a scene, a car or an object moving through a scene, a particular face entering the scene, a face, a shadow, animals entering the scene, an automobile entering or leaving the scene, etc.

In some embodiments, a feature description of the event can be determined for each event. The feature description, for example, may be determined using a feature detector algorithm such as, for example, SURG, SIFT, GLOH, HOG, Affine shape adaptation, Harris affine, Hessian affine, etc. In some embodiments, the feature description can be determined using a high level detection algorithm. Various other feature detector algorithms may be used. In some embodiments, the feature description may be saved in the video storage location such as, for example, as metadata associated with the video.

At block 210 a first set of object attribute data may be determined from the video clip using machine learning techniques based on machine learning data 230. The dashed lines shown in the flow chart show the flow of data but may not show a step in the process 200. Between blocks 230 and 210, machine learning data may be sent and/or used to determine a first set of object attribute data. The first set of object attribute data may include any type of attribute data.

In some embodiments, the first set of object attribute data may be determined using supervised machine learning techniques. For example, the machine learning data 230 may include a plurality of video clips and a plurality of corresponding object attributes for the plurality of video clips. Support vector machines or decision trees may be used as the type of machine learning functions and may be trained using the machine learning data 230 to produce machine learning functions that can be used to predict the first set of object attribute data.

In some embodiments, the first set of object attribute data may be determined using any type of machine learning technique such as, for example, associated rule learning techniques, artificial neural network techniques, inductive logic programming, support vector machines, decision tree learning, Bayesian networks, reinforcement learning, representation learning, similarity and metric learning, sparse dictionary learning, convolution networks, genetic algorithms, etc.

At block 215 a second set of object attribute data may be received from a video annotation service such as, for example, video annotation service 125. The second set of object attribute data may be received, for example, through network 115. In some embodiments, the second set of object attribute data may be created based on user input.

At block 220 the first set of object attribute data and the second set of object attribute data may be compared. For example, the first set of object attribute data may comprise a matrix or vector of data values and the second set of object attribute data may comprise a matrix or vector of data values. Each of one or more values of the vectors or matrices may be compared.

In some embodiments, the comparison that occurs in block 220 can provide a measure of the quality of the first set of object attribute data. If the second set of object attribute data and the first set of object attribute data are the same, similar, and/or congruent then the comparison can be used to validate the quality of the first set of object attribute data and/or the machine learning process used to determine the first set of object attribute data.

If the second set of object attribute data and the first set of object attribute data are not the same, similar, and/or congruent then the comparison can be used to revise the machine learning process used to determine the first set of object attribute data.

At block 225 the results of the comparison that occurred at block 220 may be used to update the machine learning data 230. In some embodiments, comparison data may be sent to machine learning data 230 and may be used to revise, update, modify, and/or change the algorithm or inferred function that was used to determine the first set of object attribute data. In some embodiments, the updated machine learning data 230 may be used as training data for the machine learning algorithm.

In some embodiments, the first set of object attribute data may be determined using supervised learning techniques. For supervised training purposes, for example, the video clip may be the input to the supervised learning algorithm and the second set of object attribute data may be the desired output for the input data. Using this data and/or other machine learning data 230, the machine learning functions used to determine the first set of object attribute data may or may not be revised. In some embodiments, the comparison data and/or the second set of object attribute data may be added to the machine learning data 230 and the functions used to determine the first set of object attribute data may be continuously updated and/or revised based on the updated machine learning data 230.

In some embodiments, attribute data may be exported. If there is a disagreement between the first set of object attribute data and the second set of object attribute data the exported attribute data may include the second set of object data. In some embodiments, if some or all of the second set of object data is missing, then the data from the first set of object data may be exported.

Figure 3:
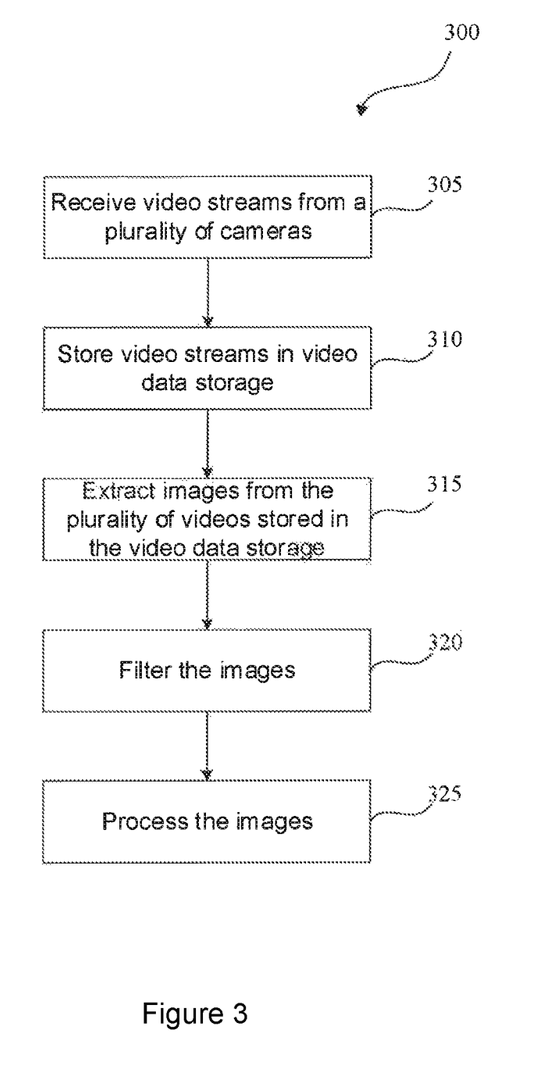
FIG. 3 is a flowchart of a method for processing images from a video according to some embodiments.

FIG. 3 is a flowchart of an example process 300 for processing video streams. One or more steps of the process 300 may be implemented, in some embodiments, by one or more components of system 100 of FIG. 1, such as video processor 110. Although illustrated as discrete blocks, various blocks may be divided into additional blocks, combined into fewer blocks, or eliminated, depending on the desired implementation.

Process 300 may begin at block 305. At block 305 the system 100 may receive video streams from a plurality of cameras such as, for example, camera 120, camera 121, and/or camera 122. The video streams, for example, may be received as an mjpeg video stream, h264 video stream, VP8 video stream, MP4, FLV, WebM, ASF, ISMA, flash, HTTP Live Streaming, etc. Various other streaming formats and/or protocols may be used.

In some embodiments, at block 310 the video processor 110 may ensure that the video streams are stored in one or more cloud storage locations such as, for example, video data storage 105. In some embodiments, the video streams may be converted to lower bandwidth video files such as, for example, the video streams may be converted to a video file with a lower resolution, more compression, or a lower frame rate, etc.

At block 315 images from the videos may be extracted for processing. In some embodiments, processing individual video frames rather than a video clip or video file may be less time consuming and/or less resource demanding. Video processor 110 may extract images from the video data storage 105.

In some embodiments, at block 320 the images may be filtered. For example, images that include only the foreground or include a majority of the foreground may be filtered out. As another example, images that do not include an event of interest may also be filtered. Event detection and/or determination may be determined in various ways, some of which are described herein. As another example, poor quality images may be filtered out. These images may include images that are not in focus, have poor lighting or no lighting, etc. In some embodiments, the video processor 110 may filter the images.

In some embodiments, the video processor 110 may execute a function on the image prior to determining whether to filter the image. For example, the video processor 110 may determine whether the image includes at least a portion of an event or whether the image has sufficient quality for processing.

At block 325 the images may be processed. In some embodiments, the images may be processed as described in conjunction with process 200 shown in FIG. 2. Various other processing may occur. For example, the images may be processed to determine a set of object attribute data of one or more objects within the image. As another example, the images may be processed to determine whether to trigger an alarm. As another example, the images may be processed to predict future activity that is likely to occur within a future image. As another example, the images may be processed for camera tracking purposes. As another example, the images may be processed to determine suspicious events occurring within the image. As another example, the images may be processed to synchronize cameras recording videos and/or images of the same scene. As another example, the images may be processed to prepare video summaries. As another example, the images may be processed to filter out false alarm events. In some embodiments, the system 100 may include one or more web servers that may host a website where users can interact with videos stored in the video data storage 105, select videos to view, select videos to monitor using embodiments described in this document, assigning or modifying video attributes, searching for videos and/or video clips of interest, setting alarms based on events occurring within one or more selected video clips, selecting and/or identifying foreground portions of videos, enter feedback, provide object attribute data, select cameras from which to synchronize data, etc. In some embodiments, the website may allow a user to select a camera that they wish to monitor. For example, the user may enter the IP address of the camera, a user name, and/or a password. Once a camera has been identified, for example, the website may allow the user to view video and/or images from the camera within a frame or page being presented by the website. As another example, the website may store the video from the camera in the video data storage 105 and/or the video processor 110 may begin processing the video from the camera to identify events, features, objects, etc. The computational system 400 (or processing unit) illustrated in FIG. 4 can be used to perform and/or control operation of any of the embodiments described herein. For example, the computational system 400 can be used alone or in conjunction with other components. As another example, the computational system 400 can be used to perform any calculation, solve any equation, perform any identification, and/or make any determination described here.

Figure 4:
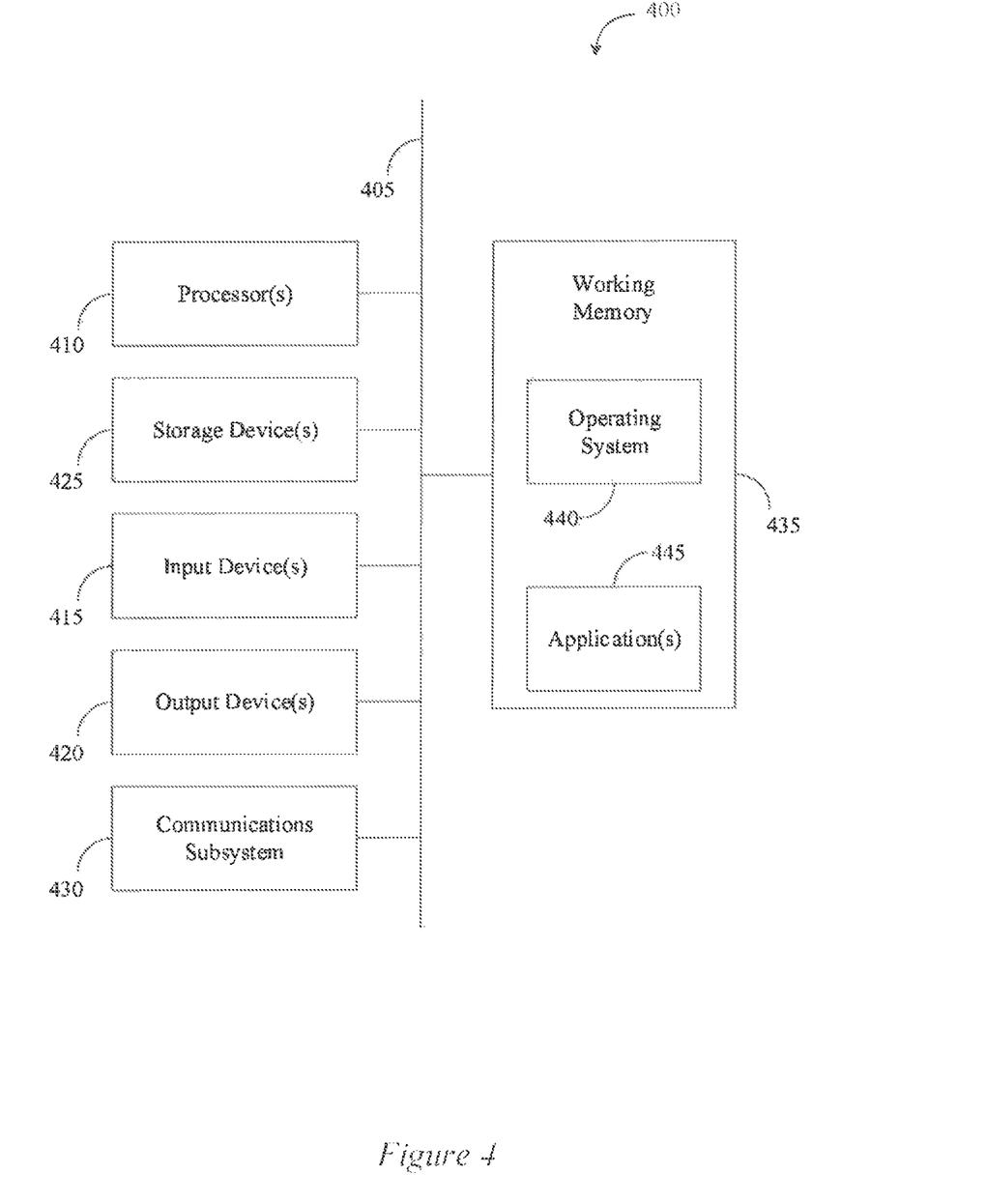
FIG. 4 shows an illustrative computational system for performing functionality to facilitate implementation of the various embodiments described in this document.

The computational system 400 may include any or all of the hardware elements shown in the figure and described herein. The computational system 400 may include hardware elements that can be electrically coupled via a bus 405 (or may otherwise be in communication, as appropriate). The hardware elements can include one or more processors 410, including, without limitation, one or more general-purpose processors and/or one or more special-purpose processors (such as digital signal processing chips, graphics acceleration chips, and/or the like); one or more input devices 415, which can include, without limitation, a mouse, a keyboard, and/or the like; and one or more output devices 420, which can include, without limitation, a display device, a printer, and/or the like.

The computational system 400 may further include (and/or be in communication with) one or more storage devices 425, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 400 might also include a communications subsystem 430, which can include, without limitation, a modem, a network card (wireless or wired), an infrared communication device, a wireless communication device, and/or chipset (such as a Bluetooth® device, an 802.6 device, a Wi-Fi device, a WiMAX device, cellular communication facilities, etc.), and/or the like. The communications subsystem 430 may permit data to be exchanged with a network (such as the network described below, to name one example) and/or any other devices described herein. In many embodiments, the computational system 400 will further include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

In some cases, the storage medium might be incorporated within the computational system 400 or in communication with the computational system 400. In other embodiments, the storage medium might be separate from the computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.), then takes the form of executable code.

The term "substantially" means within 4% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A computer-implemented method to train a video annotation machine learning process, the method comprising:
   obtaining a video directly from at least one camera at a location;
   determining that a predetermined event occurs in the video;
   identifying a first set of object attribute data associated with the event in the video based on a machine learning process and machine learning data;
   receiving a second set of object attribute data of the event in the video from a user or external source;
   comparing the first set of object attribute data with the second set of object attribute data;
   validating the quality of the first set of object attribute data when the first set of object attribute data is determined to be sufficiently similar to the second set of object attribute data; and
   revising the machine learning process and the machine learning data when the first set of object attribute data is determined not to be sufficiently similar to the second set of object attribute data.

2. The method of claim 1, wherein the predetermined event comprises a person moving through a scene, a car moving through a scene, an object moving through a scene, a particular face entering a scene, a face, a shadow, one or more animals entering a scene, and an automobile entering or leaving the scene.

3. The method of claim 1, wherein the user or external source comprises a video annotation service.

4. The method of claim 1, wherein the first set of object attribute data is saved as metadata associated with the video.

5. The method of claim 1, wherein the predetermined event is determined to occur in the video using a feature detection algorithm.

6. The method of claim 1, further comprising:
   exporting the first set of object attribute data when the first set of object attribute data is determined to be sufficiently similar to the second set of object attribute data;
   exporting the first set of object attribute data when some of the second set of object attribute data is missing; and
   exporting the second set of object attribute data when the first set of object attribute data is determined not to be sufficiently similar to the second set of object attribute data.

7. A computer-implemented method to train a video annotation machine learning process, the method comprising:
   obtaining a video directly from at least one camera at a location;
   extracting one or more images from the video;
   filtering the one or more images from the video;
   determining that a predetermined event occurs in the one or more filtered images;
   identifying a first set of object attribute data of the event in the one or more filtered images based on a machine learning process and machine learning data;
   receiving a second set of object attribute data of the event in the filtered images from a user or an external source;
   comparing the first set of object attribute data with the second set of object attribute data;
   validating the quality of the first set of object attribute data when the first set of object attribute data is determined to be sufficiently similar to the second set of object attribute data; and revising the machine learning process and the machine learning data when the first set of object attribute data is determined not to be sufficiently similar to the second set of object attribute data.

8. The method of claim 7, wherein the predetermined event comprises a person moving through a scene, a car moving through a scene, an object moving through a scene, a particular face entering a scene, a face, a shadow, one or more animals entering a scene, and an automobile entering or leaving the scene.

9. The method of claim 7, wherein the user or external source comprises a video annotation service.

10. The method of claim 7, wherein the first set of object attribute data is saved as metadata associated with the filtered images.

11. The method of claim 7, wherein the predetermined event is determined to occur in the video using a feature detection algorithm.

12. The method of claim 7, further comprising:
exporting the first set of object attribute data when the first set of object attribute data is determined to be sufficiently similar to the second set of object attribute data;
exporting the first set of object attribute data when some of the second set of object attribute data is missing; and
exporting the second set of object attribute data when the first set of object attribute data is determined not to be sufficiently similar to the second set of object attribute data.

13. The method of claim 7, wherein the filtering the one or more images from the video comprises:
filtering one or more images that primarily include foreground;
filtering one or more images that are of poor quality;
filtering one or more images that are not in focus; and
filtering one or more images that have poor lighting.

14. A system for training a video annotation machine learning process, the system comprising:
a network;
a machine learning database; and
a video processor configured to:
obtain a video directly from at least one camera at a location;
determine that a predetermined event occurs in the video;
identify a first set of object attribute data of the event in the video based on a machine learning process and machine learning data;
receive a second set of object attribute data of the event in the video from a user or an exterior source connected to the video processor via the network;
compare the first set of object attribute data with the second set of object attribute data;
validate the quality of the first set of object attribute data when the first set of object attribute data is determined to be sufficiently similar to the second set of object attribute data; and
revise the machine learning process and the machine learning data when the first set of object attribute data is determined not to be sufficiently similar to the second set of object attribute data.

15. The system of claim 14, wherein the predetermined event comprises a person moving through a scene, a car moving through a scene, an object moving through a scene, a particular face entering a scene, a face, a shadow, one or more animals entering a scene, and an automobile entering or leaving the scene.

16. The system of claim 14, wherein the user or external source comprises a video annotation service.

17. The system of claim 14, wherein the first set of object attribute data is saved as metadata associated with the video.

18. The system of claim 14, wherein the video processor is further configured to:
export the first set of object attribute data when the first set of object attribute data is determined to be sufficiently similar to the second set of object attribute data;
export the first set of object attribute data when some of the second set of object attribute data is missing; and
export the second set of object attribute data when the first set of object attribute data is determined not to be sufficiently similar to the second set of object attribute data.

19. The system of claim 14, wherein the video is a set of filtered images of an original video.

20. The system of claim 19, wherein the set of filtered images are images that have been filtered based on primarily including foreground, being of poor quality, being not in focus, and having poor lighting.

* * * * *